(12) United States Patent
McMahon et al.

(10) Patent No.: US 7,440,992 B1
(45) Date of Patent: Oct. 21, 2008

(54) CELL-BASED COMPUTING PLATFORM WHERE SERVICES AND AGENTS INTERFACE WITHIN CELL STRUCTURES TO PERFORM COMPUTING TASKS

(75) Inventors: Russell W. McMahon, Woodside, CA (US); W. Allan Goode, Mountain View, CA (US)

(73) Assignee: Agent Software Corporation, Mountain View, CA (US)

( * ) Notice: Subject to any disclaimer, the term of this patent is extended or adjusted under 35 U.S.C. 154(b) by 624 days.

(21) Appl. No.: 10/944,287

(22) Filed: Sep. 16, 2004

Related U.S. Application Data

(60) Provisional application No. 60/503,759, filed on Sep. 16, 2003.

(51) Int. Cl.
*G06F 15/173* (2006.01)
(52) U.S. Cl. ...................................... 709/202
(58) Field of Classification Search .................. 709/201, 709/202, 203
See application file for complete search history.

(56) References Cited

U.S. PATENT DOCUMENTS

| | | | | |
|---|---|---|---|---|
| 4,694,396 A | * | 9/1987 | Weisshaar et al. | 719/313 |
| 4,754,395 A | * | 6/1988 | Weisshaar et al. | 719/313 |
| 4,914,583 A | * | 4/1990 | Weisshaar et al. | 719/313 |
| 5,369,704 A | * | 11/1994 | Bennett et al. | 715/530 |
| 5,963,447 A | * | 10/1999 | Kohn et al. | 700/49 |

\* cited by examiner

*Primary Examiner*—David Y Eng
(74) *Attorney, Agent, or Firm*—Philip H. Albert; Townsend and Townsend and Crew, LLP

(57) ABSTRACT

System and method for using cells as a type of managed container to control the operation of mobile software agents and the run-time invocation and use of services within distributed computing environments. The cell process initially starts out empty containing neither agents nor services. The cell discovers and loads published services at run-time through a look up into a distributed service registry. After loading the service, the cell then publishes availability of the service for use by agents. If an application using agents or an agent desires to make use of a service published and provided by a cell, the application or agent makes a request to the cell to fetch an agent that will invoke the service. Prior to migrating to its new cell, the agent creates a proxy agent that provides a communication channel between the agent running within the cell and the originating agent system. Service status and results are returned through the proxy channel.

13 Claims, 12 Drawing Sheets

Cell Service Description

```
<service name="A"
        guid="service999"
        community="basic cell group"
        description="I am a simple service"
        location="http://192.168.40.1/SimpleService">
    <mobility canmove="y"
              preload="n"/>
    <preferenvironment platform="windows"
                       cpu="i686"
                       workingmemory="1 gigabyte"
                       persistentmemory="5 megabytes"
                       networkbandwidth="128 kilobits"/>
    <costing amount=".008 us cents"
             type="transaction"/>
    <interface>
        <x description="I am a simple set method"
           type="string"/>
        <y description="I am another simple set method"
           type="float"/>
    </interface>
</service>
```

Fig. 2 A

Agent Service Description

```
<service name="A"
        guid="service999"
        community="basic cell group"
        description="I am a simple service"/>
    <costing amount=".008 us cents"
             type="transaction"/>
    <interface>
        <x description="I am a simple set method"
           type="string"/>
        <y description="I am another simple set method"
           type="float"/>
    </interface>
</service>
```

Fig. 2B

Agent Invoke Service Description

```
<agent name="A"
    guid="agent999"
    community="basic cell group"
    description="I am a simple agent"
    location="http://192.168.40.1/SimpleAgent ">
  <targetinterface guid="service999" priority="7">
    <x parameter="I am a invoking the simple set method"/>
    <y parameter="99.9"/>
  </targetinterface>
</agent>
```

Fig. 4

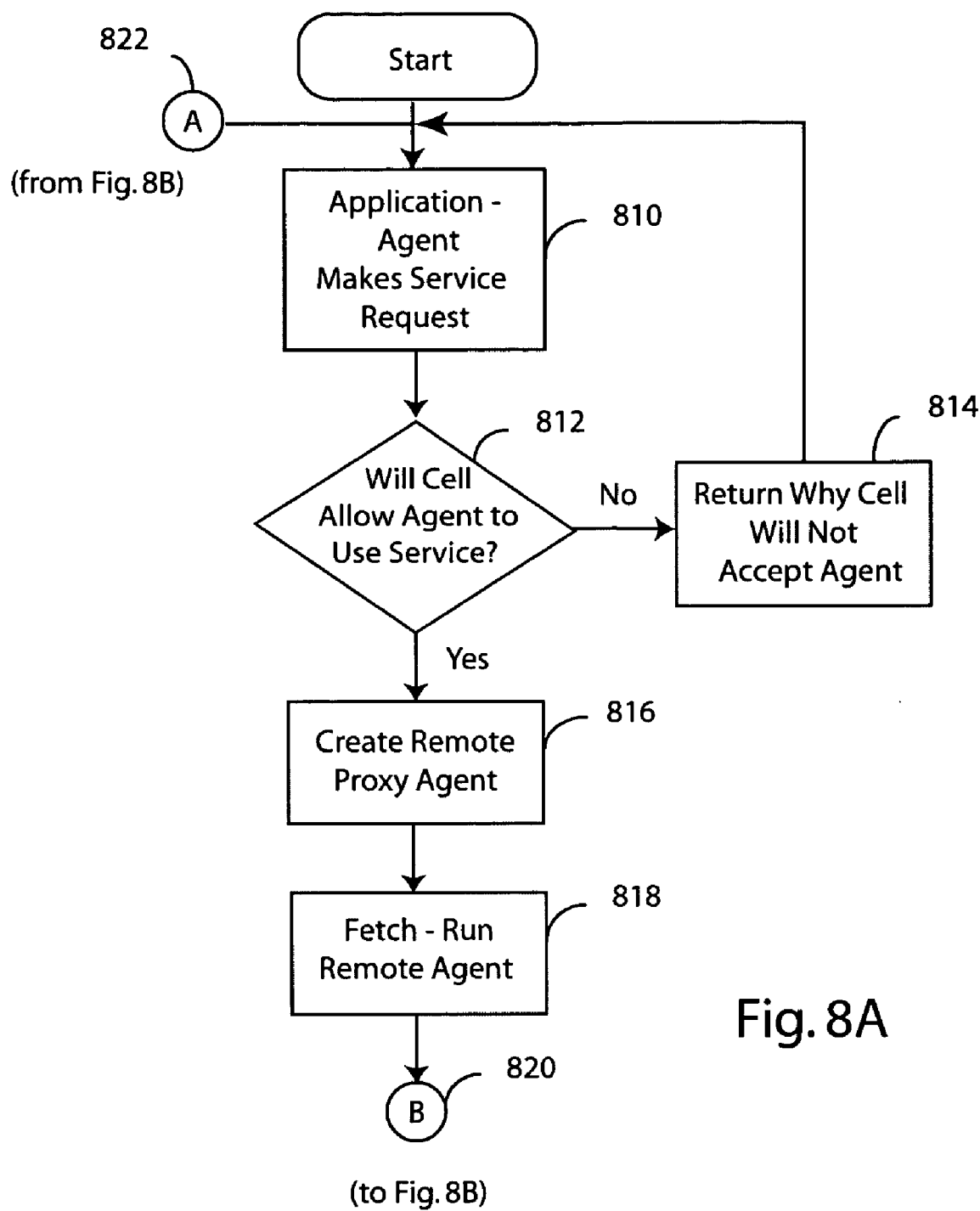

Cell to Cell Inter-Process Communication
```
<cell name="A"
      guid="cell999"
      community="basic cell group"
      description="I am a simple cell"/>
  <cellmetrics cpu="i686"
               workingmemory="1 gigabyte"
               persistentmemory="30 gigabytes"
               networkbandwidth="128 kilobits"/>
               agentcount="2"
               servicecount="3"/>
  <move>
    <service guid="service999"/>
  </move>
```

Fig. 9

CELL-BASED COMPUTING PLATFORM WHERE SERVICES AND AGENTS INTERFACE WITHIN CELL STRUCTURES TO PERFORM COMPUTING TASKS

CROSS-REFERENCE TO RELATED APPLICATIONS

This application claims priority from co-pending U.S. Provisional Patent Application No. 60/503,759 filed Sep. 16, 2003 entitled "Self-Contained, Mobile, Autonomous Software Agent", which is hereby incorporated by reference, as if set forth in full in this document, for all purposes.

BACKGROUND OF THE INVENTION

1. The Field of the Invention

The present invention is generally related to distributed computing environments and in particular to secure operation of agents accessing services as components of the distributed computing environment.

2. The Prior State of the Art

Distributed computing environments allow for dispersal of tasks performed by an application. As distributed computing environments become more prevalent and well understood, many monolithic programming efforts are being replaced with modular computing efforts.

In a modular view of the computing, modules have their own identities, which are separate from descriptive attributes. A module can be a collection of programmable interfaces. Modules typically have well-defined programmable interfaces at both the source code level and the run-time executable code level. The interfaces are uniquely identified by name or some unique key value, often called a globally unique identifier (GUID). The uniqueness of a module name provides a mechanism such that the module's visibility within a containing process, application, archive, or another module is clear. For example, two spell checking processes may exist on a computing device; however without a way to distinguish between the two, an application could make use of the one of the spell checkers with unpredictable results.

One driving factor in modular-based development and run-time systems has been the need to control and reduce the increased technical complexity of software development. Goals of modular-based software development include producing software that is fully scalable to small or large computing environments and producing it faster than is possible with monolithic programming.

A typical application today using conventional monolithic programming might have an event-driven graphical user interface (GUI), network interfaces to both a local area network and the Internet, and include a multi-tiered architecture for use within client-server environments. In contrast, modules allow for a level of abstraction at design time when modeling applications and systems, so that systems can then be assembled at run-time with modules viewed as "black boxes" resulting in a known and understood behavior.

Modules that have been well tested and perform well can be used within an application with a level of trust that they will perform as expected. Modules that are buggy or do not perform well can be refactored and worked on in isolation from more stable modules. While not altogether eliminating the technical complexity of software development, applications and systems built using modules can be assembled more quickly and offer a level of trust that could not be realized in a monolithic architecture.

Several well-known frameworks support module-based computing, including Microsoft's COM, COM+, and .Net frameworks, Sun's JavaBeans framework, and OMG's CORBA environment. Using these frameworks, a developer can build modules that interact with other modules on local machines and across networks. The most common method of module interaction and communication in these environments is through a remote procedure call (RPC) mechanism, where a remote module's interface is made to be seen the same as calling a module's internal interface. Although the level of interoperability provided by RPC mechanisms between heterogeneous modules is limited, current frameworks do offer a good way to build module-based applications and systems. The frameworks also do a fair job of hiding the complexity of using modules that are distributed across the network, particularly within a local, secured network, but they present more of a challenge with unsecured networks such as the Internet.

An agent is a modular software component that has a level of autonomous behavior and acts on behalf of an application or process often referred to as the agent's "client". An agent is designed to carry out one or more specific functions for its client.

Mobile software agents are agents that can move from one environment to another environment, with their execution in the one environment able to continue in the other environment. Mobile agents can solve problems with network bandwidth utilization. If a computing process needs to sift through a large volume of remote data, having the computing process run on a local computer and access the data over a network would use considerable network bandwidth. A more bandwidth efficient method would be to have the computing process provide or invoke an agent to move near the data and perform its operations locally.

Mobile agents are also useful for overcoming problems of intermittent network connectivity. For example, if a local computer is executing a long-running process that requires processing data across the network and the local computer can become disconnected from the network, the process may fail. A better solution is to allow an agent to move near the data and perform its processing operations, then have the agent (or its data) return to the local computer when the local computer is ready to receive the results of the agent's operations.

Agents using complex programming logic can sometimes exhibit seemingly intelligent behavior. These agents are often referred to as "intelligent agents". Some intelligent agents perform a directed sequence of actions to achieve a processing goal. Some use a knowledge base. Some use artificial intelligence (AI) methods, such as neural networks to provide problem solving processing.

IBM's recently open sourced Aglets framework allows for the building and deployment of Java-based mobile agents, but their uses are limited and do not provide the container control or interaction that might be needed.

Jade is a Java-based development environment that claims Foundation for Intelligent Physical Agents (FIPA) compliance. FIPA is a non-profit organization that promotes and provides specification for the interoperability of agents. Jade code, and similar approaches, has a default mode of running without security. A security manager can be used to protect machine resources, but this must be used throughout a system to ensure full security.

A service, as used herein, is a software component that provides computer processing through a clearly defined interface. For example, an application using the information provided by the clearly defined interface could execute a "stock quote" service, and a "weather" service, possibly provided by different vendors, and combine the results into an application that provides a graphical user interface (GUI) to show how weather affects stocks. This application could provide, as an adjunct to the GUI, a service that would supply the results to other applications in a raw form as data.

A service-oriented architecture (SOA) is used to describe applications and systems built primarily using services that are made available. An example of a service is a web service. Web services might interoperate with other services and applications using a wire-level standard protocol such as the Simple Object Access Protocol (SOAP) that uses Extensible Markup Language (XML) to describe a service interface and data elements that will be sent by the invoker of the web service. SOAP is also the protocol of the returned results.

Unlike the more common Remote Procedure Call (RPC), web services use a self-describing interface to communicate. The interface fully describes the method by which the service is accessed. The contents of a SOAP message include the service interface description and data. By using self-describing interfaces and a wire-level protocol like SOAP, heterogeneous components can communicate. For example, a C++ based module can interoperate with a JavaScript web service.

The scripting of various service processes is called orchestration or workflow. Microsoft's BizTalk Server is a well-known product that provides for the orchestration of services and XML messages. There is also work being done to provide standard specifications for how web services are orchestrated. For example, Business Process Execution Language for Web Services (BPEL4WS) is one proposed standard. There are also proposed standards to address how a web service might provide support for transactional processing. Transactions are popular in database systems, where transactions provide a method to insure that a set of operations applied to the database either succeed in their entirety or fail in their entirety, leaving the database system in the same state as prior to the start of the transaction.

Some agent frameworks support services, such as web services (JADE is one example). The World Wide Web Consortium (W3C) is working on standards for agents to understand services and the functionality they offer, with Ontology Web Language for Services (OWL-S). While the generalized interaction of agents with services may make design of distributed computing environments easier, it comes at a price in terms of increased complexity and greater security concerns.

Some risks stem from the fact that untrusted (or only partially trusted) code is often allowed to execute on a machine often without the machine's owner's explicit knowledge, as is the case with mobile agents and downloaded services. The code that executes can have a cascade effect, where it modifies behavior or code that previously ran correctly but now runs poorly. An example is the application of a software patch or update that seemly installs acceptably, but after the update, the system is left operating poorly. Because the user is often unaware of the complex processing that takes place "under the covers" on the computing device, it can be extremely difficult to undo the changes caused by running mobile code.

Other security concerns with the use of mobile code are access to sensitive information that could be inadvertently used without the user's knowledge. The concerns described above are present with non-malicious code and the security concerns are greatly heightened if the mobile code has malicious intent.

One approach to maintaining security is the use of the "container" concept, wherein code runs on a platform that prevents the code from accessing other resources (software, hardware, etc.) of the platform other than through well-defined and controlled openings in the container. Examples are the Java Virtual Machine (JVM), the Java 2 Enterprise Edition (J2EE) Servlet Specification, and the Globus Toolkit. These typically require a developer to provide a significant amount of code to achieve the level of control and manageability required by automated applications.

What is needed is a system that can efficiently and securely manage service and agent interaction in a controlled environment.

SUMMARY AND OBJECTS OF THE INVENTION

The invention presented herein relates to a system and method in which the interaction between service components and agents that will make use of the service's computer processing are managed and controlled in a cell construct. The cells discover published services and load those services into the cells for later use by agents, or just make them available and load them as needed. By providing discrete processing, applications and other processes can match and negotiate for available services from those provided that best meet their application requirements and computing needs.

A service can be loaded into a cell by locating executable program code from a published service description and physically transferring the executable program code to the computer device or distributed devices operating the cell. Applications that deploy agents, as well as agents themselves, find services by looking up the services that a cell has published and made available. If an agent wants to use a service, then the agent makes a request to the cell providing the service and asks to be loaded, run and hooked up to the desired service. Agents can be loaded into the cell in the same manner as services, except the executable program code location might be contained in the agent's service request. If the cell accepts the agent's request, the agent is loaded and the service made available.

To provide a secure environment for the execution of service processes by agents, the cell does not provide a direct hook up between services and agents, but rather acts as a secure service interface to ensure that malicious or poorly performing services or agents do not harm the system or systems providing the environment. If the operations of a service or agent are found to cause system harm or instability, the cell can apply to a journal that captures all service and agent operations and return the system to a previous stable state.

A cell can act as a transaction manager for services that support transaction processing when agents choose to access those services using transaction support. Transactions allow a group of agent tasks to be executed as a single entity under control of the cell's transaction manager and either succeed or fail depending on the success or failure of all tasks in the group.

In some variations, cells form communities of cells. In some variations, cells can vote on which cell to first try a service or service upgrade (e.g., patch, new functionality) and monitor the results, thereby minimizing possible negative results on other cells.

The invention further provides for the operation of cell systems that exist behind firewalls. A bridging mechanism that uses a shared computer outside the firewall is polled by the cell system and messages, and possibly code, is forwarded to the correct cell or group of cells.

A further understanding of the nature and the advantages of the inventions disclosed herein may be realized by reference to the remaining portions of the specification and the attached drawings.

BRIEF DESCRIPTION OF THE DRAWINGS

FIG. 2 illustrates example data structures; FIG. 2A illustrates an example data structure representing a cell service description and FIG. 2B illustrates an example data structure representing an agent service description.

FIG. 4 illustrates an example data structure representing an agent invoke service description.

FIG. 8 is a flow chart illustrating a process of migration and using agents; FIG. 8 comprises FIGS. 8A and 8B; FIG. 8A shows steps of an agent requesting to be migrated to a cell and creation of a proxy agent.

FIG. 9 illustrates an example data structure representing a cell-to-cell interprocess communication description.

DETAILED DESCRIPTION OF PREFERRED EMBODIMENTS

Figure 1:
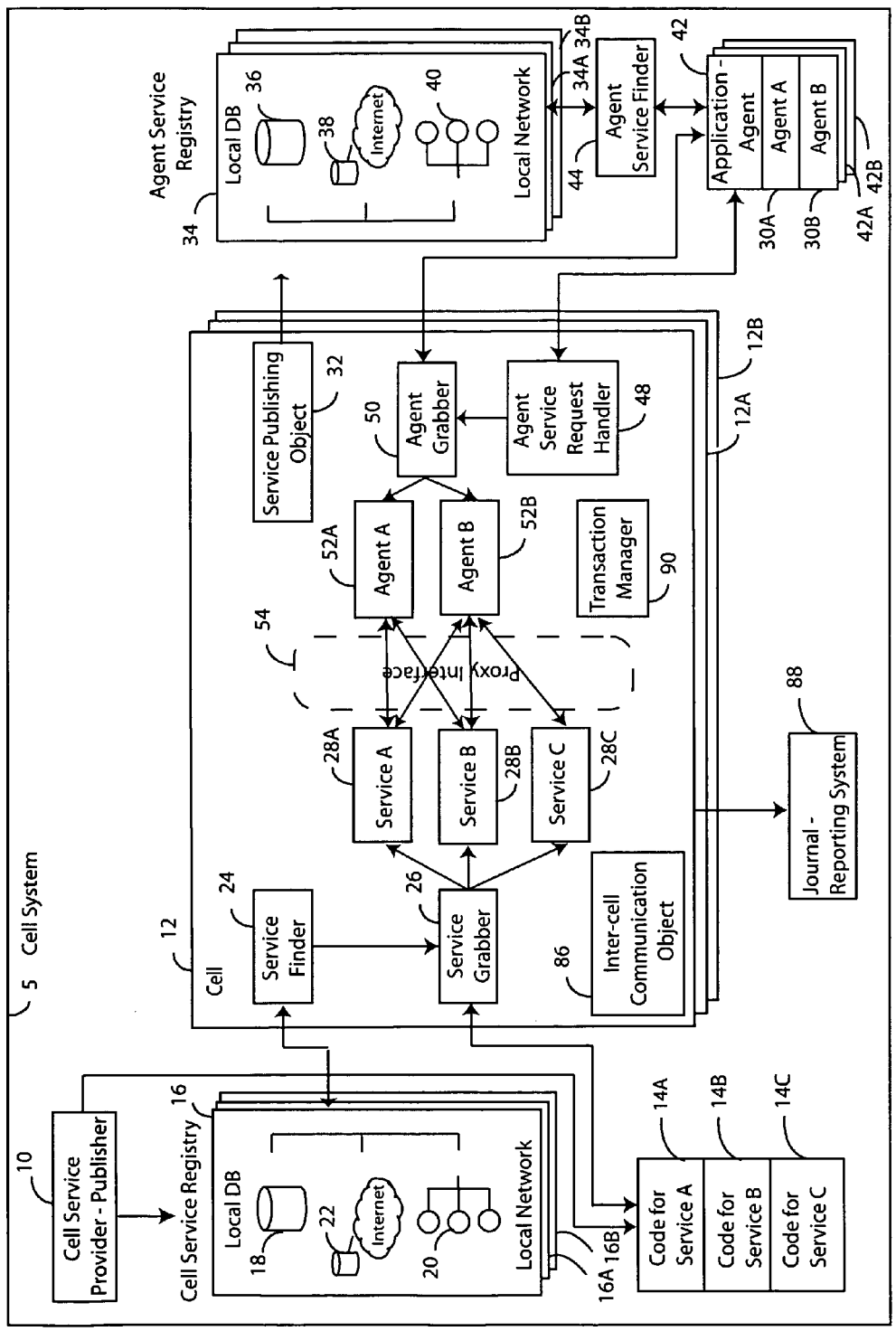
FIG. 1 is a schematic diagram of a cell system including cells, cell service registry, agent service registry, service pool, and applications and agents according to one embodiment of the present invention.

The present invention will be described using the diagrams contained herein. The diagrams provide an illustration of the process flow, and possible embodiments, but should not be taken to be the extent and entirety of this invention.

Those skilled in the art will recognize that the present invention may be practiced in networked computing environments comprising many types of devices including personal computers, personal digital assistants, mobile phones, mini computers, main frames, dedicated embedded devices, and so on. The invention also may be practiced on a standalone computer device that has not been networked. The invention does not target a particular operating system or programming language. The invention could be implemented using C++, C#, Java and/or other programming languages.

As used herein, a cell is a structure that containerizes agents and service interactions with those agents. Typically, a cell executes in a platform of one or more computers and/or computing devices, wherein the cell is executed and controlled by the entity that controls the platform. A cell provides a computing boundary and that boundary can encompass one computing device, one portion or division of a computing device, or span multiple computing devices, such as a networked computer system, cluster, RAID, etc.

As an example, a home PC owner might have one or more cells running on their local PC. While not required, it can be assumed that the entity (the PC owner, in this example) that controls the platform does not fully trust the agents that might be executed within the cell and might not trust services that are provided by the cell to those agents. A cell can provide a set of constraints pertaining to a service or group of services, to be made available to an agent or a group of agents.

Constraints can be of one or more form, where generally constraints are provided to protect the equipment, operation and/or interests of the entity owning or controlling the platform and/or data and/or code with which a cell would operate. For example, a set of cells might be set up to perform actions deemed desirable by users of a network or computing devices coupled to the network and the entity operating or controlling the network (the network operator) could desire constraints that prevent users from accessing others' data without permission, from inadvertently or intentionally setting something in motion to interfere with the operation of the network, etc.

Examples of constraints include constraints that involve physical attributes of a computing device, such as memory, whereby the cell prevents services or agents from executing if the agent or service is found to require more memory than is available. Constraints could also involve communication with other cells. A service or agent deemed harmful could be flagged such that the cell (and other cells receiving input from the cell) would not load or execute the harmful service or agent. Cells can be physically based on some particular hardware or virtually situated and span multiple physical devices.

Cell System

FIG. 1 illustrates an environment in which a cell system might operate. A cell system 5 is shown as a box and it should be understood that various systems and components operate on a physical system, such as a computer having a processor, memory, I/O, networking interfaces, etc. However, as much of the present invention can operate on conventional hardware, some details of the underlying execution hardware are omitted here for clarity as the details of the present invention.

As shown in FIG. 1, a cell system might comprise cell service provider-publishers and/or their corresponding computing systems, a cell service registry, cells, reporting systems, agent repositories, agent finders, agent service registries, a transaction manager and other components described herein. Each of these components might comprise software, firmware, logic and/or instructions running or stored on hardware devices (not all of which are explicitly shown herein) as needed to allow for the execution, storage, recall, etc. of such components.

A cell system 5 is shown in FIG. 1 comprising a provider-publisher 10 of cell services (or apparatus for providing and/or publishing), a cell service registry 16, executable code for various services (shown as code 14A-14C in the figure), a service finder 24, and a cell 12. The provider-publisher 10 makes services available by making an entry in cell service registry 16 that describes the service. Provider-publisher 10 could be a person or an automated process.

FIG. 2A illustrates an example data structure representing a cell service description, as might appear in cell service registry 16. The entries each describe a service and contain a pointer to the actual service code 14A-14C that will be executed by an agent described herein. The service code may or may not be contained in the cell service registry 16. There can be any number of service entries in the cell service registry 16 and service code available. Each provider-publisher 10 preferably maintains the code pointed to in the service descriptions provided-published by it (shown in FIG. 2A) and is responsible for publishing the availability of the services by making an entry into cell service registry 16. The service description entries could exist in a number of computer systems. For example, the entries could exist in a local database 18, in a database available over a network such as the Internet 22 or, in a simple case, as files in a locally available file system 20.

Service finder 24 can locate the service descriptions in cell service registry 16 and load them into cell 12. Service finder 24 can locate cell service registry 16 (or multiple service registries called out as 16A and 16B in FIG. 1) by using a multicast network request for the entries contained in the registry or by having the cell service registry 16 locations previously configured. For example, if the entries exist in a locally available file system 20, then the path to a directory holding the service entries could be previously configured for use by the service finder 24. The path might be a directory "C:/My Documents/Services" with files therein for each service description. Service finder 24 might periodically query cell service registry 16 to locate new service descriptions.

Service finder 24 can load all the service descriptions it finds in the service registry 16 into the cell system 5. The loading could be done by making the service descriptions available in process memory of cell 12 or by making entries into a persistent storage area accessible to cell processes. Service finder 24 may exclude some services based on information contained in the service descriptions. For example, if the cell is executing on a computer device that does not match a service description's preferred environment values, service finder 24 might skip that service and not load its service description. Service finder 24 might also be aware of previous bad or poor performance of a service and skip loading it on that basis.

Services that are not programmed to run in a cell environment, or otherwise not meeting cell service interface requirements of the given cell environment can be run in the given cell environment using a service wrapper. A service wrapper provides, among possibly other features, a programming interface that acts as a front end to the otherwise noncompliant service. This is useful for supporting legacy services in a cell environment. The service wrapper might itself have an entry in cell service registry 16.

Cell 12 executes on a computing platform (not shown) and is either controlled by the entity that owns or controls the computing platform or cell 12 executes in such a way that the computing platform is protected against actions of the cell. Cell 12 is shown in FIG. 1 comprising several elements, not all of which need be present in all implementations and cells might contain other elements not shown or described herein.

Cell 12 is shown comprising a service finder 24, a service grabber 26, instantiated services 28, a service publishing object 32, and agent service request handler 48, an agent grabber 50, instantiated agents 52, a proxy interface 54 over which instantiated services 28 and instantiated agents 52 interface, and an inter-cell communication object 86.

If a service is acceptable to cell finder 24 based on the values contained in the service description or previous knowledge of a service's performance, service publishing object 32 makes an agent service description entry into an agent service registry 34. An example of the agent service description structure is shown in FIG. 2B. Service publishing object 32 can be implemented to parallel the manner that provider-publisher 10 publishes service availability to cell system 5. Agent service registry 34 might be constructed from one or more of: a local database 36, a remote database 38 accessed over a network such as the Internet, or storage on a local network 40.

An application 42 (it should be understood that the term application may include agents in their own right, unless otherwise indicated) uses an agent service finder 44 to locate within agent service registry 34 a service or group of services that may satisfy an agent's goal or task. Agent service finder 44 could be embedded in application 42 itself or be provided as module for inclusion in application 42. Agent service finder 44, like service finder 24, may use a multicast network request for the entries contained in agent service registry 34 or by having agent service registry 34 locations previously configured.

If an appropriate service is discovered (in this example, suppose cell 12 published service availability, then application 42 will make an agent service request to agent service request handler 48 requesting that a specified agent be loaded into cell 12. Cell 12 can accept or deny the agent service request. If the agent service request is accepted, that fact is communicated to service grabber 26 and agent grabber 50.

The service grabber 26 uses the information gathered by service finder 24 and fetches the executable code pointed to by the service descriptions, possibly by moving the code into the cell and instantiating one or more service 28. Service grabber 26 might operate as a service negotiator. A service may be found acceptable to cell 12 through the values presented in the service description or by instantiating the service and negotiating with the service for loading into cell 12.

In a particular embodiment, the executable code is not run immediately and is only instantiated when an agent requests to use the service, but this default can be overridden in that embodiment. An attribute in the service description can override the default implementation by including a flag that indicates that the service is to be pre-loaded when the service is requested, rather than waiting for an agent to actually need the service. Once a service is instantiated, it is ready for use by instantiated agents.

Agent grabber 50 grabs the accepted agent by moving the accepted agent's executable code 30A from its location described in an agent invoke service description, such as that shown in FIG. 4. Agent grabber 50 then instantiates the agent as instantiated agent 52.

An instantiated agent 52 is preferably not hooked up directly to instantiated services 28, but rather through the protective interface of proxy interface 54. Using proxy interface 54, an instantiated agent operates as if it is communicating with the requested instantiated services 28 directly, but the instantiated agent is actually communicating with the cell's proxy interface, which forwards requests and responses between the instantiated agent and the instantiated service. This allows for easier tracking and journaling, as explained below. It also allows for greater control over the environment.

Details of Selected Operations

Figure 3:
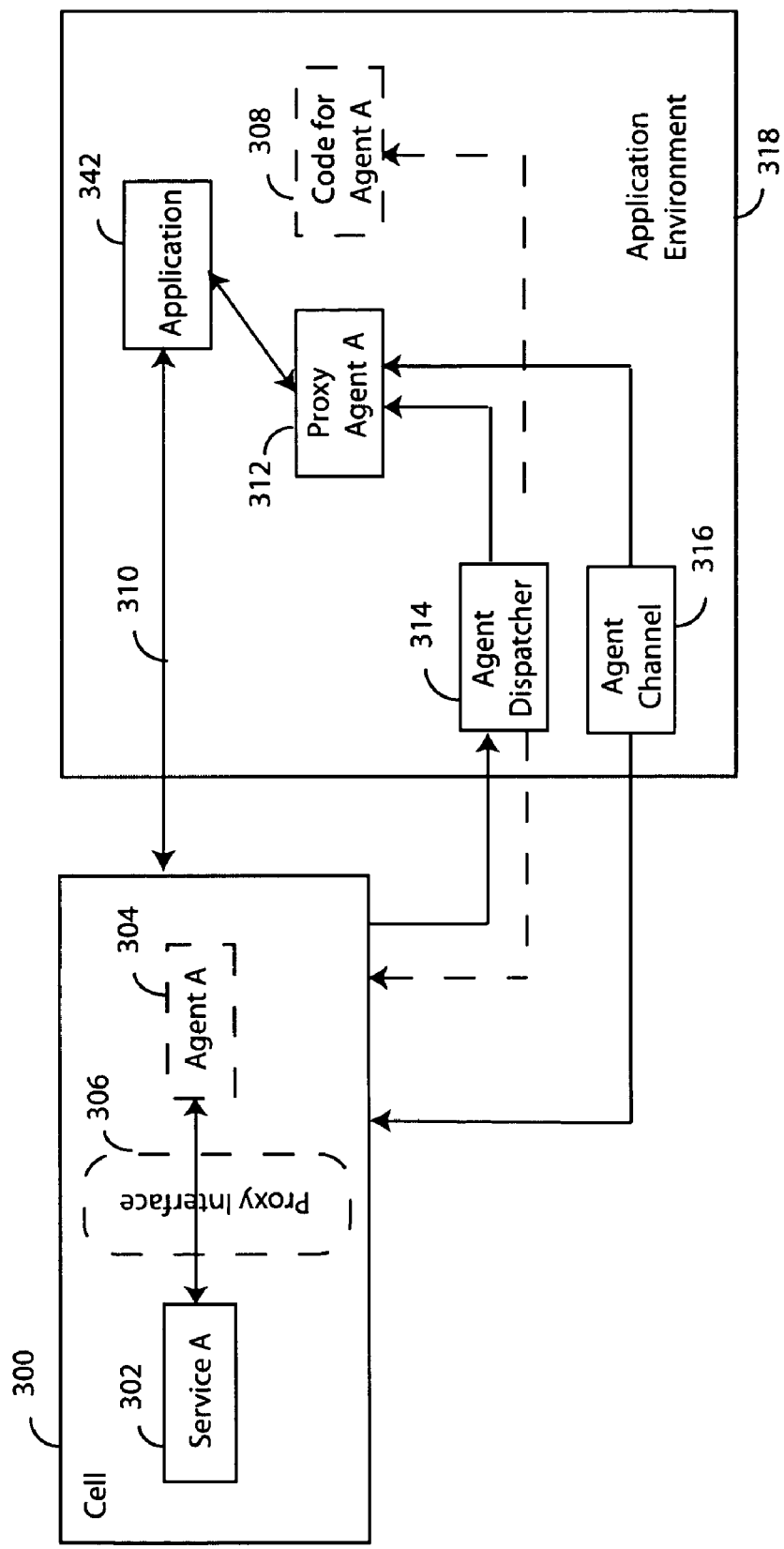
FIG. 3 is a schematic diagram of a proxy agent and the communication channels between the proxy agent and a cell based agent and service.

FIG. 3 illustrates an operation of an application 342 in making a request 310 to a cell 300 to fetch/run an agent 308. FIG. 4 illustrates one example of an agent invoke service description that is sent to cell 300, either using a multicast network request sent to a group of cells or by having the cell locations previously configured. Other approaches can be used instead.

Cell 300 is shown comprising an instantiated service A 302, an instantiated agent A 304 interfaced via a proxy interface 306. The process of making a cell service request and the subsequent creation of a proxy agent happen within application environment 318. Application 342 could have all the required processes to accomplish this task, but most likely there will be processes available to application 342 in application environment 318 to support agent service request 310, and the creation of agent 308 and/or proxy agent 312. It should be understood that, while only one cell, one service, one agent and one interface are shown by way of example, multiple cells, services, agents and interfaces might be present.

If agent service request 310 is accepted by cell 300, agent 308's code is moved into cell 300 and is instantiated as agent 304 therein. Then, proxy agent 312 is created within application environment 318. Proxy agent 312 provides for controlled communication between instantiated agent 304 and application 342. The communication is via an agent channel 316. Agent channel 316 might use the globally unique identifiers (GUIDs) to maintain a point-to-point link.

Once the agent moves to cell 300, cell 300 uses a reflection mechanism on instantiated service 302 to get a reference to the service interface and the methods offered by service 302 to agent 304. Cell 300 uses the references acquired through reflection to provide proxy interface 306 to agent 304. Agent 304 uses the published agent service description held in an agent service registry (such as agent service registry 34 shown in FIG. 1) to transact with what it believes is the instantiated service 302 while in actuality it interacts with cell 300. When the agent completes its tasks, it makes a request for termination, resulting in either disposal by cell 300 or a return to a destination accessible by the application 342 that dispatched the agent. The latter is useful where the agent obtains state during execution that was not present when agent dispatcher 314 dispatched the agent to cell 300.

FIG. 4 illustrates an example data structure representing an agent invoke service description, as might be used in the transaction that occurs in agent service request 310.

Figure 5:
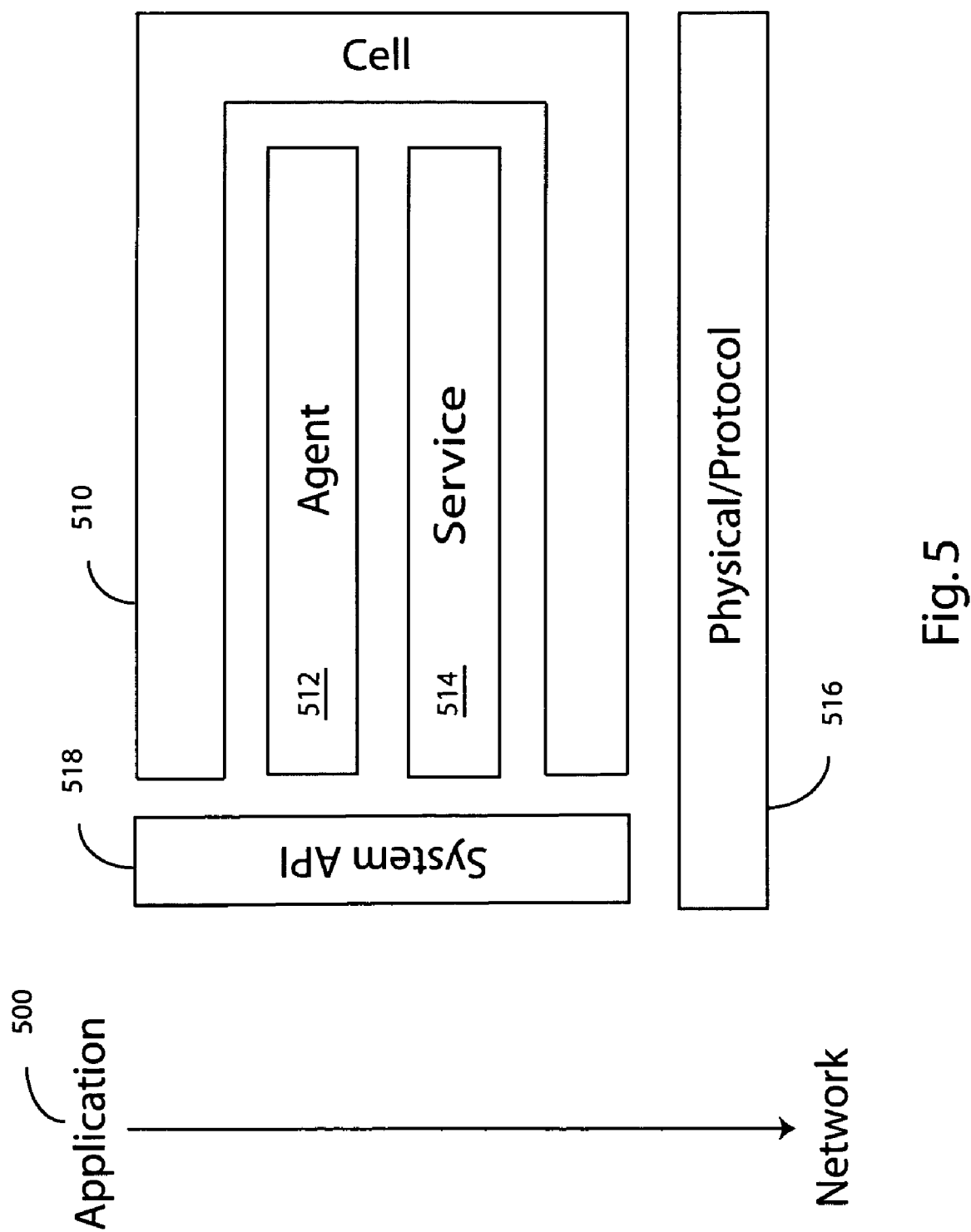
FIG. 5 is a schematic diagram illustrating a cell system and relationships between a system, cell, services, and agents.

FIG. 5 is an illustration of a system stack 500 illustrating the relationships between the various modules, including a cell 510, an agent 512, a service object 514, a physical/protocol layer 516 and a system application programming interface (API) 518. Cell 510 contains agent 512 and service object 514 and, at a lower level, includes physical and protocol modules 516. Where all modules have access to API 518 and both agents and services are migrated to the cell from possibly untrusted sources and run within the cell, security is a key concern.

To protect the cell (and its execution hardware, data, environment, etc.), various security steps can be taken. For example, the cell might require verified digital signatures for both services and agents before allowing them to execute. If the system supports a low level API to monitor system functions, it may provide for greater control and security. Communications channels within the cell system can use a standards-based encryption mechanism, such as Secure Socket Layer (SSL), to ensure that the contents of communications remain secure.

Figure 6:
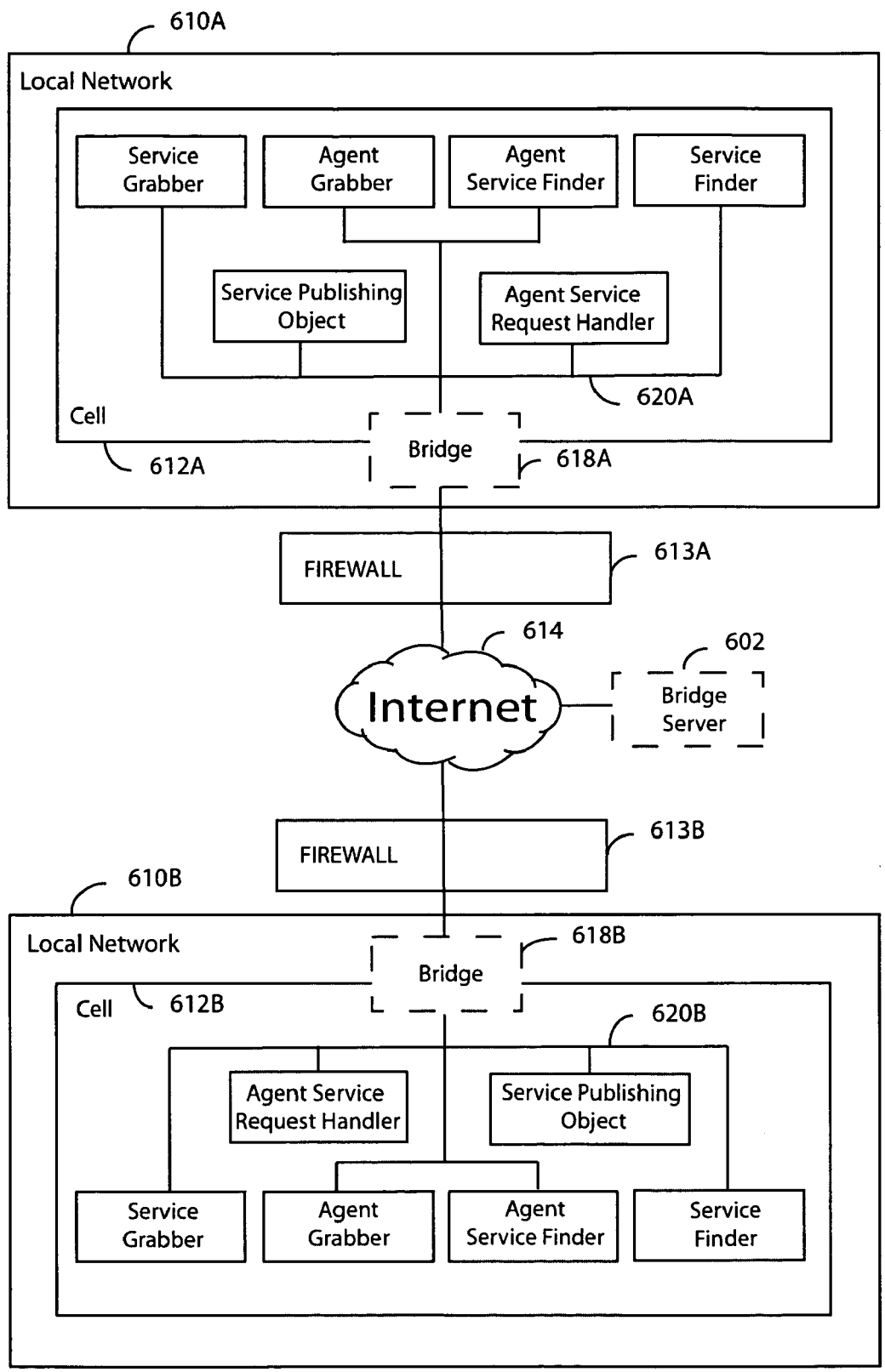
FIG. 6 is a schematic diagram illustrating cell communication from behind firewalls.

Communication between cell systems (such as cell system 5 shown in FIG. 1) located on a local network can be done using both unicast (point-to-point delivery) and broadcast network packet delivery, where network packets are sent to all computing devices on a network interested in receiving the broadcast. Referring back to FIG. 1, service finder 24, service publishing object 32, agent service finder 44 and the inter-cell communication channel 86 (described further below) might each use broadcasts or multicast to communicate between cell systems, while service grabber 26, agent grabber 50 and agent service request handler 48 might use unicast packet delivery methods. The agent channel 216 shown in FIG. 2 for providing communication between instantiated agents and proxy agents might also use unicast packet delivery methods.

Where cell systems are separated by firewalls, a bridge server might be needed to handle inter-system communications. FIG. 6 shows a bridge server 602 used to connect a local network 610A behind a firewall 613A to a local network 610B behind a firewall 613B over a network such as Internet 614. Cell 612A and cell 612B use bridges 618A and 618B, which are configured to know the network location of bridge server 602 (such as its IP address). Bridges 618 periodically check with bridge server 602 and retrieve or deliver packets between cell module sets 620A and 620B. Cell module sets 620A and 620B and their modules need not be aware that they are communicating across a firewall.

Cell System Process Flow

Figure 7:
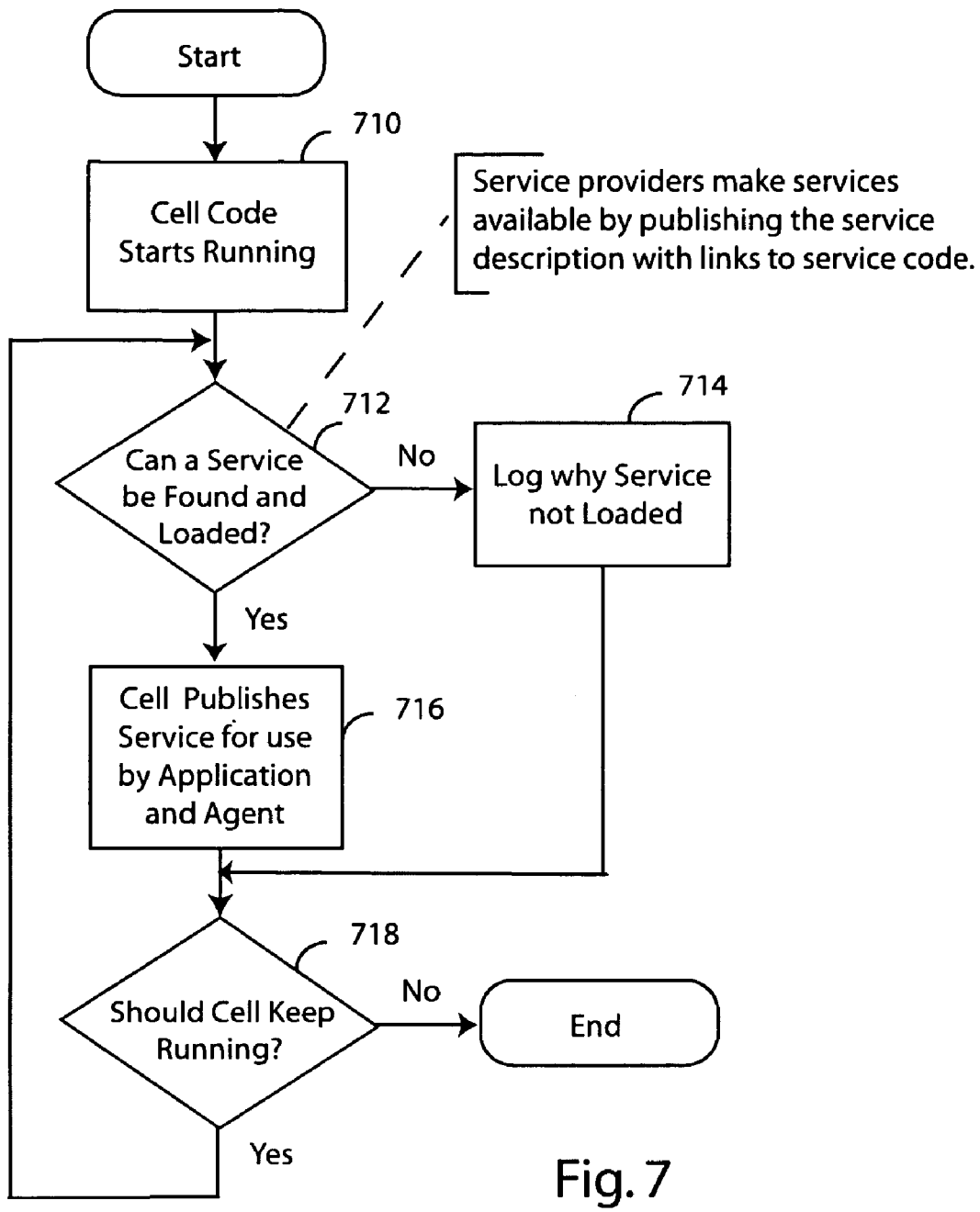
FIG. 7 is a flow chart illustrating a cell start up process including loading services.

FIG. 7 is a flow chart illustrating a cell start up process including loading services. As shown there, a cell hosted on a computing device starts running (step 710) either through an automatic startup mechanism such as UNIX System V (SYSV) initialization or through various other startup processes, including being started manually. At startup, the cell might load previously active services (712). These previously active services might be loaded from a persistent store or from locations determined using a service finder, such as service finder 24 shown in FIG. 1. Using a service finder, a cell can locate published services not already active in the cell.

If a service cannot be loaded for any reason, a log entry is made to that effect (714). If the service is loaded successfully into the cell, then the cell publishes availability of the service for use by agents (716). The cell then checks for termination requests (718), terminating if a request is made, otherwise looping back to step 712, looking for newly published services that the cell can load.

Figure 8B:
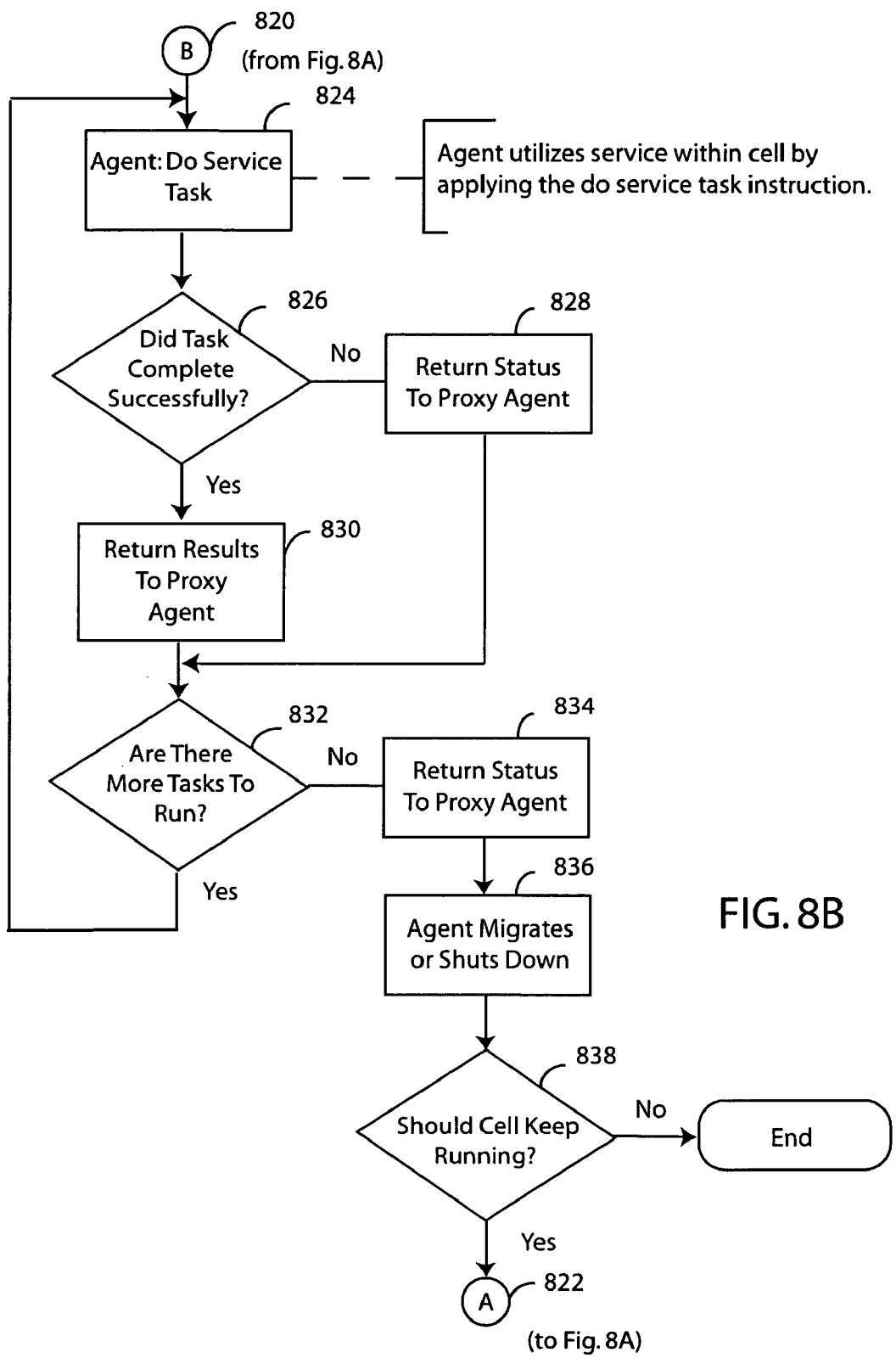
FIG. 8B shows steps of the agent using a service by processing tasks.

FIG. 8 is a flow chart illustrating a process of migration and using agents. FIG. 8 comprises FIGS. 8A and 8B; FIG. 8A shows steps of an agent requesting to be migrated to a cell and creation of a proxy agent; FIG. 8B shows steps of the agent using a service by processing tasks. Based on a defined goal or task, an application will locate a service that offers results that may satisfy the application's goal or task.

According to the steps shown in FIG. 8A, once a service has been found in a particular cell, the application makes a request to that cell to load and run an agent (810) for that application (or the agent itself when the agent is acting as the application). The cell then decides whether to load the agent (812). If the cell declines, because the cell is too busy, the cell does not trust the agent, the cell cannot support the agent's needs, or for other various reasons, the cell responds to the request with an indication of why the cell will not accept the agent (814) and the cell returns to processing and/or waiting for further service requests (loping back to step 810).

Once an agent is loaded and running within a cell (818), the agent can invoke service methods provided by services hosted by the cell to satisfy the agent's goal or task (824). The cell checks if the task completes successfully (826) and if not, returns status to the proxy agent (828), otherwise the cell and returns a result set to the proxy agent (830). In either case, processing continues at step 832.

In step 832, the cell determines whether more service tasks need to be run. If yes, the process loops back to step 824, otherwise processing continues with step 834, wherein return status is provided to the proxy agent. The agent will loop through all tasks that may be satisfied by the services provided within the cell. If there are no more tasks to be run, a status message is returned to the proxy agent and the agent will ether request to be moved to another cell or will shut itself down (836).

The cell will continue running until it is shut down (838).

Inter-Cell Communication

Inter-cell communication object 86 (shown in FIG. 1) can be used to for traffic between cells and between computing devices. Cells can broker the initial loading and instantation of services and move services to more appropriate devices or environments using object 86 to coordinate such transfers. Object 86 can also provide for encrypted communications if requested by cell 12.

FIG. 9 illustrates an example data structure representing a cell-to-cell interprocess communication description.

Journaling

A journal-reporting system 88 (shown in FIG. 1) can be implemented to maintain the state of a cell, provide cell monitoring capabilities to external management processes, and facilitate roll-back if a service or agent corrupts a cell. System 88 might also support a costing/billing capability, where costs and benefits of running services and/or agents are allocated among service providers and agents. Information in a persistent storage area such as might be maintained within journal-reporting system 88 to provide service costing information as reflected in a monetary amount, possibly as reflected in computing device performance metrics. Information in the persistent storage area might also provide a reputation system wherein applications and agents can rate the level of satisfaction had using a service.

Figure 10:
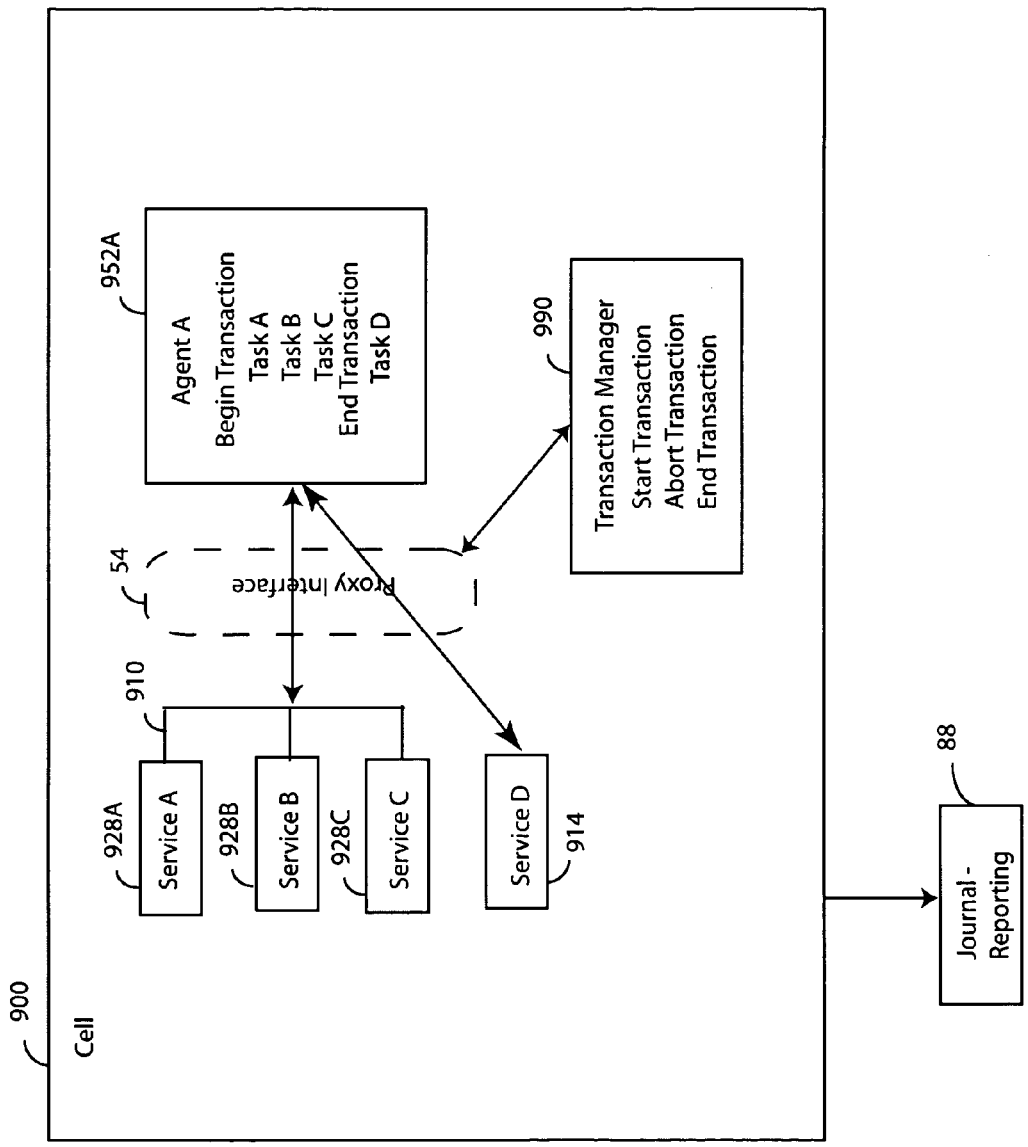
FIG. 10 is a block diagram illustrating an agent's use of a group of services by processing tasks under control of the cell's transaction processing manager.

Referring to FIG. 10, and expanding on journal-reporting system 88, suppose an agent 952A desires to use services 928A, 928B and 928C under the control of a transaction manager 990. Suppose further that agent 952A also wants to access a service 914 outside of transaction control.

Before any tasks between the step denoted in 952A as "Begin Transaction" and the step denoted "End Transaction" are run, transaction manager 990 notifies each service that will be involved in the transaction that they should prepare themselves to run under transaction control. In the case of the example shown in FIG. 10, the tasks A, B and C of Agent A (952A) require service A 928A, service B 928B and service C 928C, so each service is notified by transaction manager 990 to prepares themselves for the processing that will follow up until a commit or abort notification is sent from transaction manager 990 ending the transaction. The initial preparation often entails making sure the initial state of the service is preserved, as the service may be called on to roll back to this initial state if any service involved in the transaction fails and transaction manager 990 sends an abort and rollback notification to the services involved in the transaction.

If any service 928A, 928B or 928C is not able to satisfy the agent's request, then the service should update journal-reporting system 88 with information about the failure and transaction manager 990 should notify all services 928A, 928B and 928C that they should roll back their processing as described above. Services that will be involved in transaction need to be designed for transaction support and able to respond appropriately to the messages sent by the transaction manager. In particular, messages might include: 1) prepare for running under transaction support, 2) abort and roll-back to initial service state, 3) commit the state at the end of the transaction.

Transactional support becomes more complicated when a service involved in a transaction is dependent on the results of another service, as a potential dead lock could occur. One solution is to run the agent task using a proxy interface (such as proxy interface 54 shown in FIG. 1) but not immediately return the service results to the agent. Instead, the results are cached within the proxy interface and only at the end of all transaction processing the results are returned to the agent.

Using the teachings described herein, a cell system can be used to connect up agents and services in a controlled manner, even if the entity controlling a cell system cannot fully trust the providers of agents and services. Using a cell system with services being loaded into the cell and used by agents, an application can be built. Using the cell system, not only can applications be built, but a platform such as an entire an operating system could be built. Furthermore, the platform could be distributed and the services and agents within the cells could offer discrete operations. For example, one cell could offer security on a particular physical platform while another cell may offer network storage.

As described above, a computing device instantiates a cell, then that cell loads services according to criteria and conditions under which that cell is willing to operate. The cell then advertises the services it has loaded or is willing to load. Agents find cells advertising services that the agents need and send agent load requests to those cells. The cells consider agent load requests and load approved agents. The instantiated agents in a cell interact with the instantiated services in the cell via a sell proxy interface. A journaling system can be provided for tracking, auditing and supporting transaction processing and rollbacks. Intercell system communications might also be provided.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for creation, deployment, execution, secure operation and monitoring of scriptable mobile software agents performing activities and exchanging messages to synchronize their state, orchestrate and coordinate plan-based activities between a plurality of remote and locally distributed entities; wherein agents receive access to requested business process services through a publish subscribe technique and manifest activity processes for interaction within computing environments operating on computing platforms and composeable services are accessed to perform computing actions on behalf of applications, comprising:

cell structures offering a computer-implemented method for dispatching agents that run services and a scriptable development environment for the building of persistent software agents, and repositories and queues for monitoring system component interactions wherein each cell structure includes an agent-service interface;

communicating with a cell service registry containing entries for registered services that have published availability service properties capabilities and cost in computer interpretable form to the computing environment;

an agent-service registry containing entries for registered agent-services operable within the aforementioned cell structures; and an inter-cell communication network implemented through synchronous or asynchronous over air or over wire communications protocols wherein service information is synchronized among relevant system components.

2. The system of claim 1, further comprising:

a service pool accessible as a Web service;

consisting of a service negotiator coupled to the service pool for loading services into a cell structure when criteria for service execution for that cell structure are met;

further comprised of a service-agent matcher for matching applications or agents to a service that fulfills an application or an agent's goal(s) or task(s); and a proxy interface for secure handling of the agent-service interface and optimization of agent requests and service selection.

3. The system of claim 1, further comprising persistent storage for lists of services and agents contained within the cell structures and a current operating status of services and agents wherein optimized services are selected to fulfill Quality of Service (QOS) process specification requirements.

4. The system of claim 1, further comprising encryption blocks with root certificate integrity protection for symmetrically encrypting and decrypting messages sent between the cell and other elements of the distributed computing environment to insure decentralized network data integrity.

5. The system of claim 1, wherein the requested executable code fetched and run by a cell is Symmetrically encrypted to insure decentralized process integrity and trust between distributed system components and the application.

6. The system of claim 1, further comprising logic to control the time-to-live lifecycle of the requested service using a duration attribute associated with the process service description to manage and insure continuing attainment of application process specification QOS metrics.

7. The system of claim 1, further comprising plan-based metrics and logic to create a priority attribute associated with the agent's request to schedule the activity and use the aforementioned priority to queue access to an agent using a specific service.

8. The system of claim 1, operating on a computing platform, wherein services are accessed to perform computing actions on behalf of applications, managing execution of scriptable agent code comprising:
   publishing services to a cell service registry;
   requesting agent/service endpoint interface links to services executable code in service publication records in the cell service registry;
   locating and connecting to published cell services in the cell service registry;
   using the located information contained in a services description of the cell service registry to load local internal services or invoke remote Web service process into cell;
   publishing, to an agent-service registry, availability of cell services for evaluation use and QOS negotiation by agents;
   matching applications or agents to an appropriate service that fulfills a task or goal of that application or agents by lookup into the cell service registry;
   requesting a cell to fetch and run agents to make use of services published and provided by a cell;
   creating proxy agents to maintain the communication between agents that have been fetched to within the cell and applications or agents from where original agents where were fetched from.

9. The system of claim 8, further comprising:
   modeling an agent's goals and activities using a standard modeling language.

10. The system of claim 9, wherein the standard modeling language is the Universal Modeling Language (UML).

11. The system of claim 8, further comprising:
   using a community or workgroup attribute associated with a service to limit the amount of messages that pass over a network; and
   organizing services and agents into a hierarchy below the community or workgroup.

12. The system of claim 8, further comprising:
   using a test interface to ensure the correct operation of a service, wherein a service provides a test interface and known return values when the interface functions are called by a cell.

13. The system of claim 8, further comprising:
   communicating between cells in order to move a service to a more appropriate computing device.

* * * * *